United States Patent [19]
Oshida et al.

[11] Patent Number: 5,081,360
[45] Date of Patent: Jan. 14, 1992

[54] IRRADIATING CONVEYANCE APPARATUS

[75] Inventors: Mamoru Oshida, Funabashi; Masaru Oizumi, Koto; Yoshiyuki Ichizawa, Soka, all of Japan

[73] Assignee: Yoshino Kogyosho Co., Ltd., Tokyo, Japan

[21] Appl. No.: 478,464

[22] Filed: Feb. 12, 1990

[30] Foreign Application Priority Data

Feb. 14, 1989 [JP] Japan .................................. 1-34079

[51] Int. Cl.$^5$ ............................................ H01J 37/20
[52] U.S. Cl. ............................. 250/492.3; 250/453.1; 198/384
[58] Field of Search .................... 250/492.3, 453.1; 198/384, 385

[56] References Cited

U.S. PATENT DOCUMENTS

| | | | |
|---|---|---|---|
| 2,308,039 | 1/1943 | Ashlock | 198/384 |
| 2,387,709 | 10/1945 | Ashlock | 198/385 |
| 3,080,902 | 3/1963 | Wilkerson | 198/384 |
| 4,005,774 | 2/1977 | Valero | 198/384 |
| 4,013,261 | 3/1977 | Steigerwald et al. | 250/492.3 |
| 4,174,043 | 11/1979 | Salame et al. | 215/1 C |

FOREIGN PATENT DOCUMENTS 54321 12/1981 Japan .
47689 10/1987 Japan .

Primary Examiner—Bruce C. Anderson
Attorney, Agent, or Firm—Oliff & Berridge

[57] ABSTRACT

An irradiating apparatus comprises a bucket group consisting a plurality of buckets spaced equally from each other and connected to a first endless chain, and a roller group consisting of a plurality of roller located under the bucket group. Each bucket comprises a barrel shaped body having a bottom which has a plurality of openings. Moreover, the bucket receives an article to be transferred such as preform and transfers it in a horizontal position therein. The rollers are connected to second endless chains. A pair of rollers are arranged parallel to each other in the transfer direction. The roller has a plurality of lands which intrude in the openings of the bucket. A pair of rollers are rotated in the same direction to rotate the article to be transferred. The roller group travels at the same speed in the same direction as those of the bucket.

1 Claim, 3 Drawing Sheets

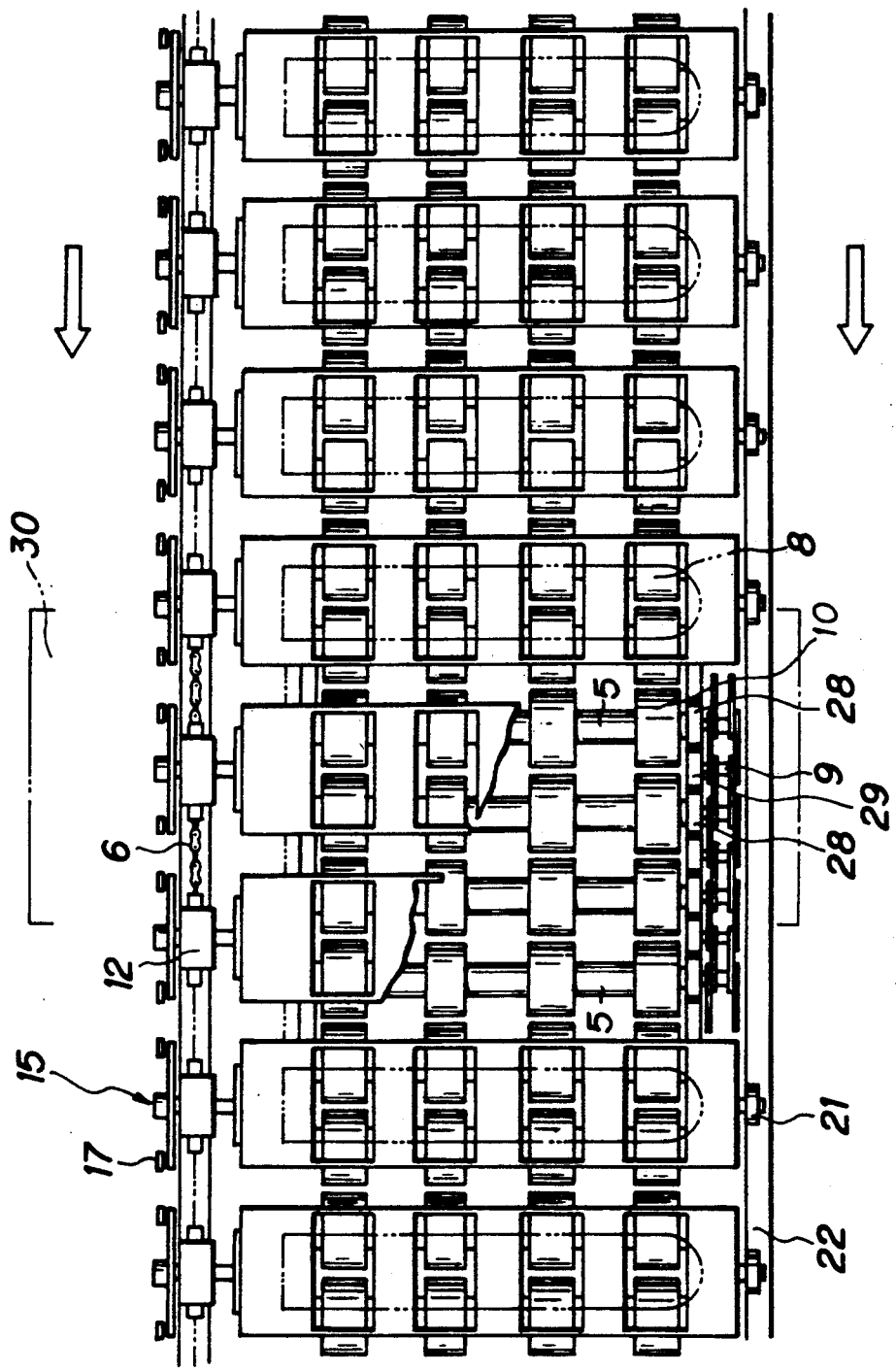

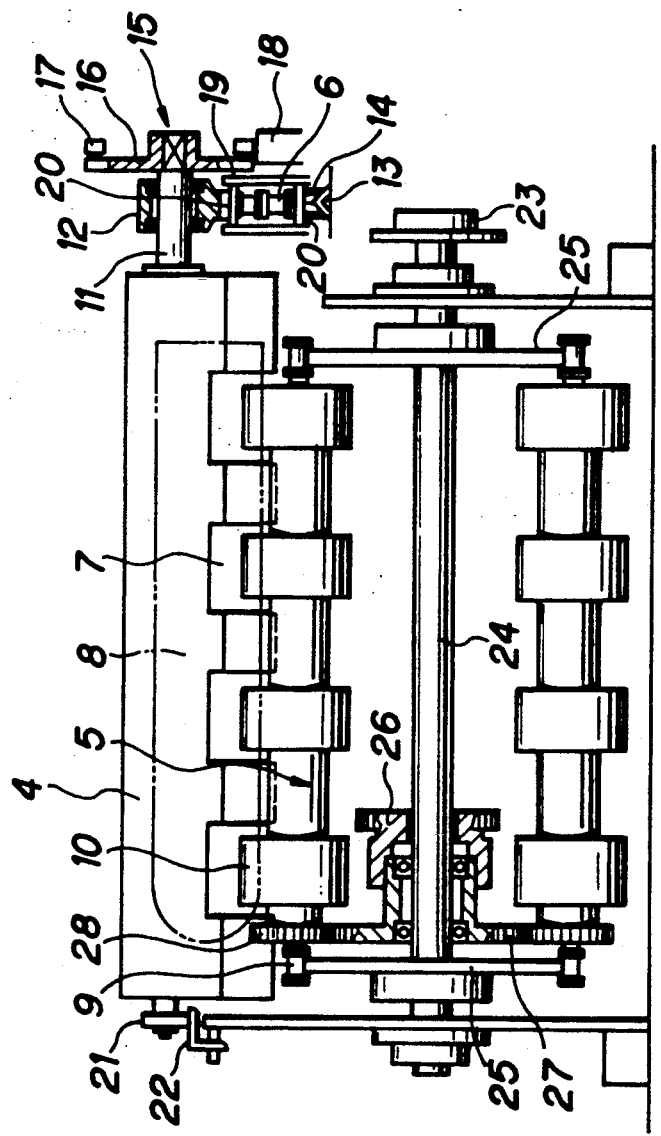

IRRADIATING CONVEYANCE APPARATUS

BACKGROUND OF THE INVENTION

1. Field of the Invention

The present invention relates to an irradiating conveyance apparatus for irradiating radiation such as an electron beam to a preform of synthetic resin product, in particular, as acrylonitrile resin product while the preform is transferred to prevent to prevent monomers from remaining in such a synthetic resin product.

2. Prior Art

Hitherto, it has been known that when containers or bottles made of synthetic resin, in particular, acrylonitrile resin, are filled with a content such as a beverage, monomers retained in the synthetic resin material are extracted into the content and as a result the quality of the content changes to have a strange taste and to become harmful for the health and safety of persons.

It is well known to irradiate an electron beam to a preform of a synthetic resin product in order to remove the harmful monomers as described in Japanese Patent Publication Nos. 5654321 and 62-47689.

Japanese Patent Publication No. 62-47689 concretely discloses an apparatus for irradiating the electron beam. Such an apparatus includes a truck provided with a plurality of rotary plugs mounted thereon and each adapted for fitting a neck portion of the preform thereto, and an electron beam accelerator positioned above a path of the truck. The truck is advanced along the path while the plugs are rotated to rotate the preforms to thereby irradiate the electron beam from the electron beam accelerator to the advancing and rotating preform. The reason why the truck is advanced is that all the preforms are to be passed through an electron beam irradiation area directly under the electron beam accelerator and the reason why the preform is rotated is that the inside of the preform is to be effectively and uniformly irradiated by the electron beam of which penetrating power is not high.

The known irradiating conveyance apparatus mentioned above has disadvantages in that fitting of preform is not easy and the plug does not have interchangeability since only preforms having at least the same neck portion of the same diameter can be treated and consequently the productivity is very low. That is, since the attachment of the preform is effected by fitting the neck portion of the preform into the plug, it is necessary to individually attach each preform to each plug by hand and also to individually detach each preform from each plug by hand after irradiation, and further a preform having a different diameter of the neck portion cannot be attached to the same plug. Therefore, when preforms having neck portions of a different diameter are treated, it is required to perform such a troublesome work that all the plugs are exchanged.

SUMMARY OF THE INVENTION

It is an object of the present invention to eliminate the aforementioned disadvantages and to provide a conveyance apparatus for irradiating an electron beam or the like arranged such that articles to be transferred such as a preform can be rotated without difficulty and articles having different shapes and sizes can be easily treated without exchange of components and having high productivity.

It is another object of the present invention to provide an irradiating conveyance apparatus adapted for irradiating ultraviolet ray, heat ray, radiation or the like without limiting to the electron beam.

According to the present invention, an irradiating conveyance apparatus comprises a bucket group 1 and a roller group 2 as shown in accompanying drawings.

The bucket group 1 consists of a plurality of barrel shaped buckets 4 parallelly spaced from each other by an equidistance and connected to first endless chain 6. The barrel shaped bucket has a bottom provided with a plurality of bottom openings 7 spaced from each other in the longitudinal direction thereof and is adapted for receiving an article to be transferred such as a preform 8 in a horizontal position.

The roller group 2 consists of a plurality of rollers 5 parallelly spaced to each other under the bucket group 1 and connected to second endless chain 9. The first and second endless chains 6 and 9 are synchronously driven at the same speed in the same direction. Each of rollers 5 has a plurality of lands 10 spaced in the longitudinal direction thereof by the same distance as that of the bottom openings 7 of the bucket 4 so that the lands 10 protrude within the bucket 4 through the bottom openings 7. The rollers 5 are rotated in the same direction to rotate the article to be transferred such as a preform 8 by a pair of rollers 5 of which lands contact with the article within the bucket. The rollers 5 and the buckets 4 are moved at the same speed in the same direction.

It is preferable to position an electron beam accelerator directly above the roller group so as to irradiate the electron beam to the preform rolling in the bucket to provide an electron beam irradiating apparatus for removing monomers from the preform.

The function of the present invention will be now described with reference to FIG. 1 of the accompanying drawings.

According to the aforementioned construction of the present invention, for example when the articles to be transferred such as preforms 8 are irradiated by the electron beam to remove the monomers from the preforms, firstly the preforms 8 are inserted respectively in the buckets 4 in a horizontal position. In this case, the preform 8 is simply inserted in the bucket 4 without necessity of fitting operation 1. Moreover, it is only necessary that the perform 8 have a shape and size which is accepted by the bucket 4 and therefore various preforms 8 can be treated by the bucket.

The preform 8 received in the bucket 4 is transferred to a position directly above the roller group 2. When the bucket 8 is reached above the roller group 2, the upper portions of lands on a pair of rollers 5 and 5 get into the bottom openings 7 in the bucket 4. The pair of rollers 5 and 5 rotate in the same direction and progress together with the bucket 4. Thus, the preform 8 in the bucket 4 contacts with and is rotated by the lands 10 of the pair of the rollers 5 and 5. In this case, it is not necessary that the preform 8 is fitted to the plug to transmit the rotation to the preform as the prior art. Accordingly, the means for transferring and rotating the preform is very convenient.

The preform continuously progresses to pass the electron beam irradiation area 30 under the electron beam accelerator 3. Under this condition, whole the preform is uniformly irradiated by the electron beam since the preform is rotated and consequently the monomer is effectively removed. The penetrating force of the electron beam is low, but the electron beam can effectively penetrate into the inside of the preform 8 by rotating the preform.

When the rollers 5 have progressed and passed over the electron beam irradiation area 30 along with the bucket 4, the rollers 5 separate from the bucket 4 and the lands 10 get out the bottom openings 7. Then the rotation of the preform 8 ceases and the preform remains in the horizontal position within the bucket 4. The stoppage of rotation of the preform is also automatically performed by separating the rollers 5 from the bucket 4 so that any special operation is not required. The preform 8 in the bucket 4 is continuously transferred in the horizontal position and finally taken out of the bucket without necessity of any difficult detaching operation as prior art.

As mentioned above, according to the present invention, the article to be transferred such as a preform can be easily rotated during transfer to uniformly irradiate the electron beam to the whole preform, and the preforms having different shapes and sizes can be treated without any exchange of components. Thus, the apparatus of the present invention has better productivity than the conventional apparatus.

The present invention is not limited to the irradiation of electron beam and is also applicable for irradiating ultraviolet ray, heat ray or other radiation. Thus, the apparatus according to the invention is widely usable and extremely useful.

The invention will be hereinafter described more in detail with reference to an embodiment shown in the accompanying drawings.

BRIEF DESCRIPTION OF THE DRAWINGS

FIG. 2 is a plan view of the conveyance apparatus of FIG. 1; and

FIG. 3 is a sectional view taken along a line A—A in FIG. 1.

DESCRIPTION OF THE PREFERRED EMBODIMENT

Figure 1:
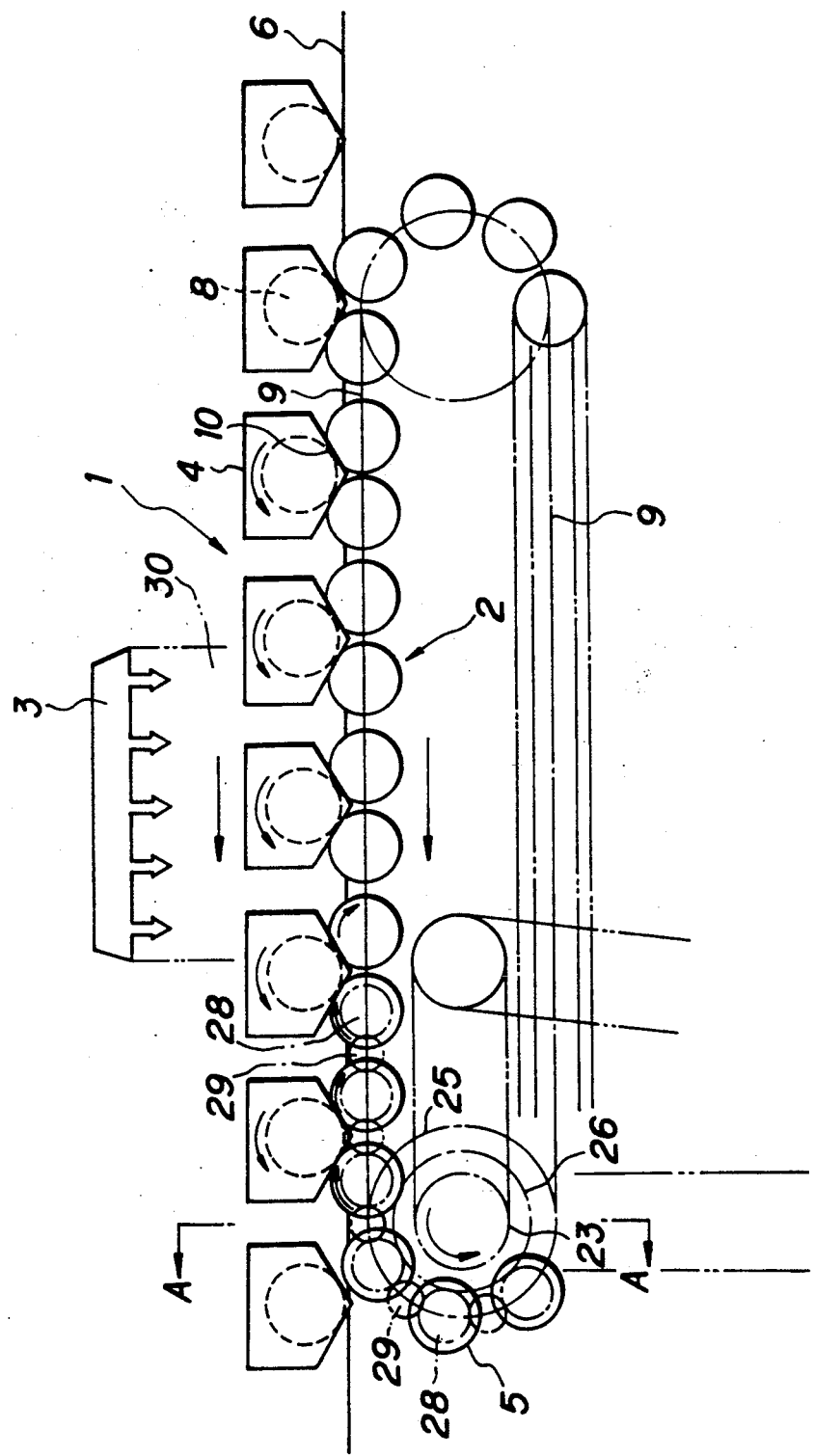
FIG. 1 is a schematic elevational view illustrating components in an embodiment of an irradiating conveyance apparatus according to the present invention.

FIGS. 1 to 3 show an embodiment of an electron beam irradiating conveyance apparatus for removing monomers according to the present invention. A bucket group 1 consists of a plurality of buckets 4 which are equally spaced from each other and each bucket is connected to the first endless chain 6 at one end of the bucket. The bucket 4 has a fixed shaft 11 fixed one of its ends. The fixed shaft 11 is rotatably supported by a bearing 12 which is connected to an upper bearing 20 of the first endless chain 6. A lower bearing 20 of the chain 6 is provided with a wheel 14 which is guided by an angle shaped first rail 13. The upper and lower bearings 20 are cooperate with side guide rails 19.

The other end of the bucket 4 is free and has a roller 21 which is rolled on a flat second rail 22.

The first endless chain 6 is driven by a power source (not shown) to run the wheel 14 on the first rail 13 and the roller 21 on the second rail 22 to thereby progress the bucket 4. The bucket 4 has a pair of upper and lower bearings 20 which contact with the guide rail 19 when the bucket 4 gets out of the predetermined position to thereby continuously maintain the bucket in the optimum place.

The first endless chain 6 is arranged so as to turn in a horizontal plane along a curved track in an endless manner. Since the bucket 4 is connected to the first endless chain 6 only at one end thereof and the other end of the bucket is free to freely move on the second rail 22, the bucket can turn to both direction of right and left along the curved track in the horizontal plane.

The roller group 2 consists of a plurality of rollers 5 each of which is connected to the second endless chains 9 at both ends thereof. The pair of the second endless chains 9 turn in endless manner in vertical planes respectively, in contrast to the first endless chain 6.

When power from a driving source (not shown in the drawings) is transmitted to a drive member 23, the power is transmitted to the pair of endless chains 9 through a drive shaft 24 fixed to the drive member 23 and drive sprocket wheels 25 fixed to the drive shaft 24 to move the rollers 5 connected to the endless chains. The traveling speed of the rollers 5 is the same as the transferring speed of the buckets 4 by mechanically interlocking the rollers to the buckets 4.

Each of the rollers is rotatably connected at the opposite ends to the pair of second endless chains 9 and a roller gear 28 is rigidly secured to one of the ends of each roller. The power from the driving source is transmitted to a rotating member 26 secured to the drive shaft 24 and a rotating gear 27 connected to the rotating member 26 and rotatably supported on the drive shaft 24 by means of bearings. The rotating force of the rotating gear 27 is transmitted to the roller gears 28 by engaging of the rotating gear 27 with the roller gears 28. Between the roller gears 28 are interposed idler gears 29 having a smaller diameter than that of the roller gears 28 to transmit the rotating force to all the roller gears 28 and to rotate each roller gear 28 in the same direction. By rotating all the roller gears in the same direction, it is possible to rotate the preforms.

The bucket 4 has four bottom openings 7 formed in the bottom thereof and the roller 5 has four lands 10 which are corresponding to the openings 7. Thus, the upper portions of the four lands are protrude within the bucket 4 through the bottom openings 7 and contact with the preform 8 in the bucket to give rotating force to the preform. By providing a plurality of openings 7 and lands 10, it is possible to treat various preforms 8 having different lengths. That is, not only a long preform having a length corresponding to the bucket 4, but also a short preform having a length corresponding to the distance across two lands 10 can be rotated by the lands 10. The apparatus of the present embodiment can treat preforms having a diameter in a range of 20 mm to 60 mm and a length of at most 250 mm with treatment rate of 120 to 130 pieces per one minute.

In the present embodiment, the bucket group 1 travels over a distance as long as several ten meters and overlaps with the roller group 2 and a portion as shown in FIGS. 1 to 3. The electron beam accelerator 3 is arranged directly above the overlap portion and irradiates an electron beam to the preforms 8 in the electron beam irradiation area 30 to remove monomer from the preform.

The preform 8 is inserted in the bucket 4 before the bucket group 1 overlaps with the roller group 2. The preform 8 is taken out of the bucket 4 after the preform 8 has been irradiated and the bucket group 1 has separated from the roller group 2. The preform 8 can be taken out of the bucket 4 by various ways. In the case of the present embodiment, the preform 8 is automatically taken out of the bucket by a body 15 for reversing the bucket 4 secured to the outer end of the fixed shaft 11, and a cam formed in a track 18 on which a reversing element 17 of the body 15 travels. That is, the body 15 includes a reversing plate member 16 on which four reversing elements 17 are rotatably provided and spaced from the center of the reversing plate member 16 by an equidistance and also spaced from each other by an equidistance. The track 18 has two reversing cams (not shown) formed in the shape of a mountain at positions to be reversed and grooves formed for receiving the reversing element 17 at the front and rear sides of each reversing cam. Thus, the bucket 4 is reversed by cooperation of the first reversing cam and the body 15 to drop the preform from the bucket by its weight and subsequently the reversed bucket 4 is again reversed by the second reversing cam to return the bucket to the normal position for receiving a new preform 8.

It should be understood that an electron beam irradiating conveyance apparatus for removing monomer is mentioned in the above embodiment, but the present invention is not limited to electron beam irradiation and is also widely applicable for irradiating ultraviolet ray, heat ray and other rays to various articles to be transferred for the purpose of surface treatment or properties treatment.

What is claimed is:

1. A conveyance apparatus comprising:
   a bucket group comprising a plurality of barrel shaped buckets spaced equally from each other and connected to a first endless chain means for moving said buckets, said buckets each having a plurality of bottom openings,
   a roller group positioned adjacent said bucket group and comprising a plurality of roller means connected to a second endless chain means, each of said roller means having a plurality of lands, upper portions of said lands penetrating into the bottom openings of said buckets, said rollers traveling at the same speed as that of said buckets in the same direction as that of said buckets; and
   an electron beam accelerator means for irradiating an electron beam arranged directly above the roller group.

* * * * *